May 10, 1966 R. L. WHITNAH 3,250,482

TAPE CARTRIDGE

Filed Nov. 5, 1963

INVENTOR.
RONALD L. WHITNAH
BY
Carpenter, Abbott, Coulter & Kinney
ATTORNEYS

United States Patent Office 3,250,482

Patented May 10, 1966

3,250,482

TAPE CARTRIDGE

Ronald L. Whitnah, White Bear Lake, Minn., assignor to Minnesota Mining & Manufacturing Company, St. Paul, Minn., a corporation of Delaware Filed Nov. 5, 1963, Ser. No. 321,513
6 Claims. (Cl. 242—55.13)

This invention concerns a novel tape cartridge, especially a recording tape cartridge, having a superior hub bearing support for the reel enclosed in the cartridge.

To realize the high fidelity attainable in magnetic recording, it is essential that the tension in the recording tape remain constant as the pay-out and take-up reels turn, and that depends in part on the way the reels are supported in the recorder. If the reels are rotated unevenly, because of either a loose or binding fit on the support spindles for example, tape will be fed past the pickup head at a changing speed, and wow and flutter heard in the sound output. Beside not contributing to wow and flutter, the support arrangement chosen must also permit the reels to turn at high rewind speeds and be capable of long lasting and reliable use under all atmospheric conditions.

In ordinary tape recorders the reels are placed on permanent spindles which are mounted in relatively elaborate, antifriction bearing arrangements, but tape cartridges, with the reel or reels inside a cartridge, present a different situation. One approach to rotatively supporting reels inside tape cartridges has been to manufacture the cartridges with the reels loose in the cartridge; when the cartridges are used, they are placed over the permanent spindle of the recorder which passes through an opening in the cartridge into the spindle opening of the reel. This approach has disadvantages arising from difficulties in handling a loose reel of tape in a cartridge as well as the inappropriateness of the arrangement for use in an apparatus which automatically feeds tape from a cartridge to the recorder.

In those cartridge designs in which the reel has been journalled between the sidewalls of the cartridge, the support means have generally been inferior for use as rotative supports for reels in high fidelity systems. The present invention involves what applicant believes is the first practical design meeting the requirements of high fidelity. The design permits the use of simple and durable parts manufactured under careful tolerances which are easily assembled to provide a firm, smooth support. Beside meeting the requirements of high fidelity, the new reel mounting support is economical and adapted for use in a mass produced unit.

A recording tape cartridge incorporating applicant's invention comprises a boxlike container having two parallel, spaced, side walls between which a reel is supported. A cylindrical sleeve is rigidly secured between and normal to the side walls by means that extend through the sleeve and are attached to the side walls and which engage the sleeve and prevent it from rotating. A bushing, fitted through the center of the reel, provides the reel hub and is journalled on the sleeve. Since the bushing and sleeve are preferably metal they form a metal-to-metal connection; as well as both being precisely dimensioned, at least one should be self lubricating. Also, preferably the bushing has a length that is a substantial proportion of the length of the sleeve, which aids in giving the reel firm support, and a wear resistant end bearing surface is preferably provided along at least one ers disposed between the flat ends of the sleeve and container wall, against which the bushing rotates. Washtainer wall provide satisfactory bearing surfaces.

The invention will be readily understood from the following detailed description of a preferred embodiment in conjunction with the accompanying drawings wherein.

Figure 1:
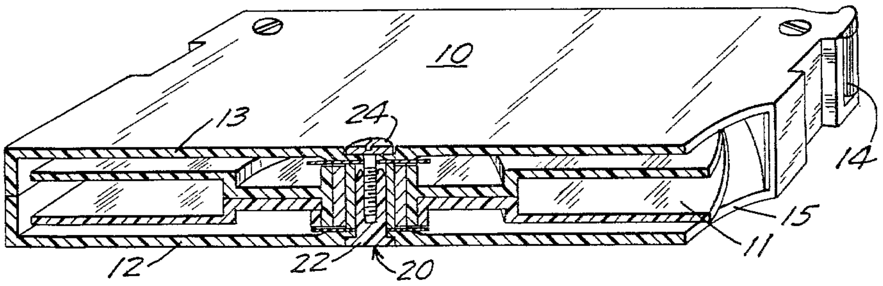
FIG. 1 is a section through a cartridge shown in perspective.

The magnetic recording tape cartridge shown in FIGURE 1 includes a shallow boxlike plastic container 10 which encloses a flanged reel 11. Two side walls 12 and 13 of the container are parallel to and slightly spaced from the reel flanges, while the edge walls of the container are slightly spaced from the edges of the flanges. The container has two openings in one edge wall as illustrated in FIGURE 1, one opening 14 through which the recording tape passes to and from the cartridge, and a second larger opening 15 through which the reel is engaged by a drive roller of the tape recorder.

Two united sections 16 and 17 form the reel 11, each section including one reel flange, and the section 16 having a vertical circular rim 18 that defines a central aperture. A bushing 19 is fixed inside the vertical rim 18 and forms the reel hub. Preferably the bushing is impregnated with a lubricant as by molding it from oily powdered bronze, and the bushing's overall length and inside diameter are dimensioned under close tolerances.

The reel 11 is centrally mounted in the container 10 by means of a hub bearing support 20 which is passed through the bushing 19 and which includes a sleeve 21 slidingly fitting within the bushing 19. The sleeve 21 has the same or slightly greater length than the bushing 19 and preferably is made of a material such as steel that will not wear to cause dust problems and will be long lasting. The sleeve might also be made self lubricating instead of or in addition to the bushing 19. An expansible, internally threaded barrel nut 22 fits inside the sleeve 21, and a small screw 24 is threaded in the barrel nut. The walls 12 and 13 have apertures 25 and 26 through which the nut 22 and screw 24 respectively are inserted, and are formed with bosses 28 and 29 around each aperture 25 and 26. Washers 30 and 31, which might also be made self-lubricating, are placed between each boss and the ends of the bushing 19 and sleeve 21, and provide end bearing surfaces between which the bushing rotates. For cartridges which in use are always placed with the same side wall down, one washer might suffice, but the present design, having two washers and a bushing that substantially fills the space between them, provides a firm bearing arrangement in which the reel is well supported both radially and axially. The ends of the sleeve and bushing are machined under tolerances assuring right angularity with their axes, while the lengths and cooperative diameter dimensions of both are also carefully controlled to assure the proper spacing of the cartridge side walls, and smooth rotation and firm support of the reel.

Figures 2, 3:
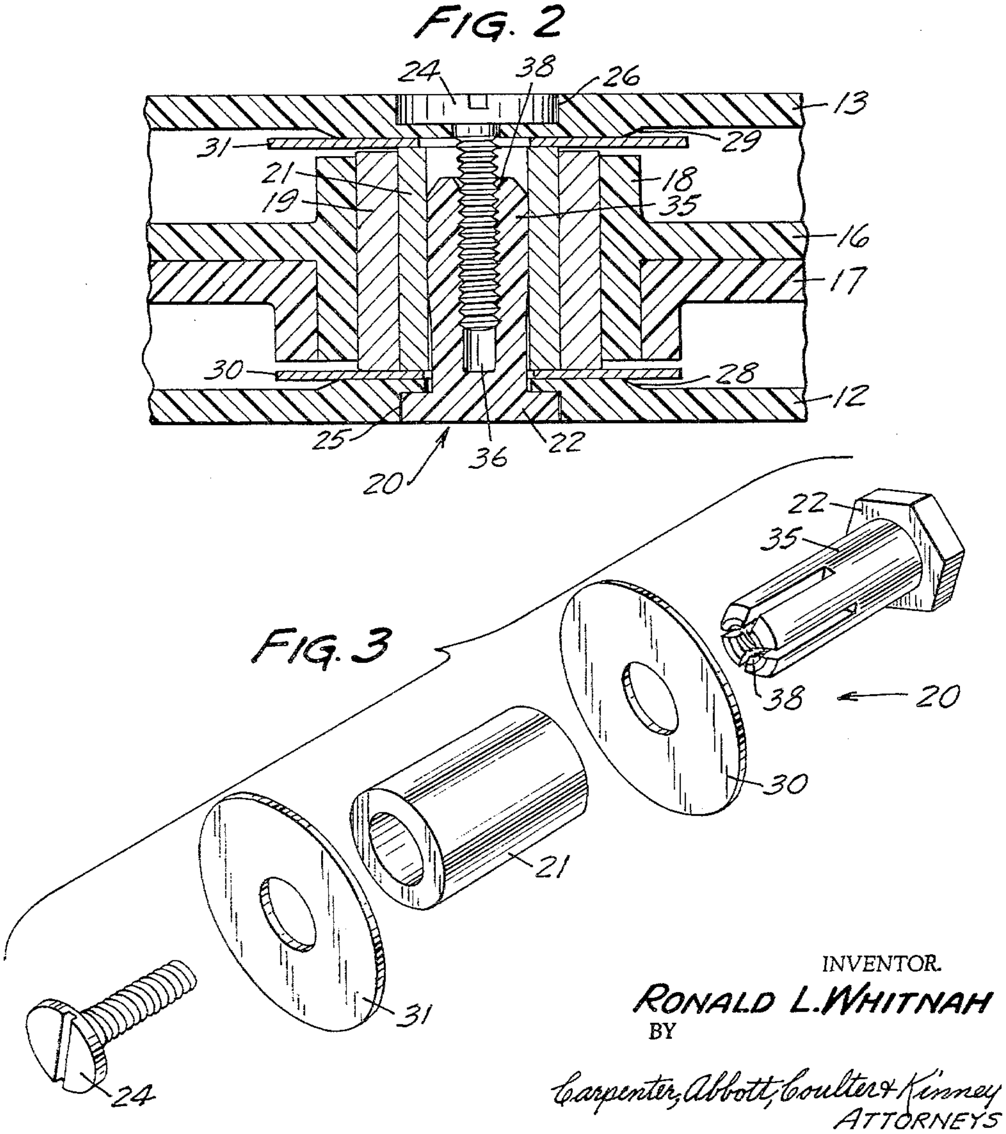
FIG. 2 is an enlarged section of a central area of the cartridge.
FIG. 3 is an enlarged, exploded view of the parts of the reel bearing support.

The nut 22 is produced from a resilient, elastic material, preferably an acetal copolymer such as Delrin, made by DuPont. Its shaft portion 35 has a central bore 36 to receive the screw 24, which burnishes threads in the side of the bore. A length of the end of the shaft 35 is axially slotted through to the bore 36 to form sections which can be flexed radially outward. The inner surface of each of these flexible sections is preferably tapered inwardly over a length 38 at the open end of the bore 36 to a bore diameter less than the outside diameter of the screw so that the screw 24 spreads the sections as it is turned into the bore as shown to a somewhat exaggerated degree in FIGURE 2. If desired the screw 24 may also have a lead taper to facilitate entry of the screw into the bore 36. When expanded, the nut 22 frictionally engages the sleeve 21 and prevents it from rotating, while at the same time the ends of the sleeeve have preferably been tightened against the washer surfaces by the screw 24. The bushing 19 fits freely but snugly on the sleeve over the bushing's whole length, thus supporting the reel smoothly and without play. The arrangement provides consistently, from reel to reel, uniform and free rotation in a long lasting, inexpensive structure.

In the illustrated construction, the sleeve is made of steel and is 0.343–0.345 inch long with an outside diameter of 0.2503–0.2505" and an inside diameter of 0.145–0.150", the inner and outer surfaces being concentric within 0.002" T.I.R. (total indicated reading). The inside diameter of the oil impregnated, sintered bronze bushing is 0.2515–0.2520", the outside diameter is 0.377–0.378", the two surfaces are concentric within 0.003" T.I.R., and the length is 0.329–0.335". Both ends of the sleeve are perpendicular to the axis of the sleeve within ±10' and the ends of the bushing are perpendicular to its axis within 0.003" T.I.R. Brass washers are disposed between the ends of the sleeve and bushing and the container wall. The shaft 35 of the nut 22 has a length of 0.366" and a diameter of 0.140–0.143" and is bored to a depth of 0.310" with a 0.060–0.063" diameter. At the open end of the bore it tapers outwardly over a length of 0.050" to a diameter of 0.065–0.070". The outside diameter of the screw is 0.086", with #2–56 American Standard threads cut in the screw leaving a diameter of 0.064".

What is claimed is:

1. A recording tape cartridge including a box-like container having two parallel spaced side walls, a precisely dimensioned smooth surfaced rigid cylindrical sleeve, expansion means positioned within the sleeve and attached to said side walls rigidly securing the sleeve between the side walls with its axis substantially normal thereto, means providing a smooth hard end bearing surface which is disposed along at least one container wall and extends generally perpendicularly to the axis of the sleeve and beyond the outer surface of the sleeve, a reel mounted within the container having a precisely dimensioned rigid bushing fixed in the reel coaxially with the reel's axis, said bushing having cylindrical bore means journalling the reel on said sleeve and having a length slightly less than the spacing between said end bearing surface and the opposite container side wall, and means lubricating the contact areas between the bushing and the sleeve and end bearing surface.

2. A recording tape cartridge including a box-like container having two parallel spaced side walls, a precisely dimensioned smooth surfaced metal cylindrical sleeve, expansion means positioned within the sleeve and attached to said side walls rigidly securing the sleeve between the side walls with its axis substantially normal thereto, means providing a smooth hard end bearing surface which is disposed along at least one container wall and extends generally perpendicularly to the axis of the sleeve and beyond the outer surface of the sleeve, a reel mounted within the container having a precisely dimensioned metal bushing that is fixed in the reel coaxially with the reel's axis, said bushing having cylindrical bore means journalling the reel on said sleeve and having a length slightly less than the spacing between said end bearing surface and the opposite container side wall, and means lubricating the contact areas between the bushing and the sleeve and end bearing surface.

3. The recording tape cartridge of claim 2 in which at least one of the sleeve and bushing is impregnated with a lubricant.

4. A recording tape cartridge including a box-like container having two parallel spaced side walls, a precisely dimensioned smooth surfaced rigid cylindrical sleeve having end faces precisely perpendicular to the sleeve's axis, means positioned within the sleeve and attached to said side walls rigidly securing the sleeve between the side walls with its axis substantially normal thereto, a washer disposed between each end face of the sleeve and the adjacent container wall and having a diameter greater than that of the sleeve to provide end bearing surfaces, a reel mounted within the container having a precisely dimensioned bushing fixed in the reel coaxially with the reel's axis, said bushing having cylindrical bore means journalling the reel on said sleeve between the end bearing surfaces, and said bushing having a length of slightly less than the distance between said end bearing surfaces, and means lubricating the contact areas between the bushing and the sleeve and end bearing surfaces.

5. A recording tape cartridge including a box-like container having two parallel spaced side walls, a precisely dimensioned smooth surfaced rigid cylindrical sleeve, a barrel nut having radially flexible portions disposed coaxially inside the sleeve and secured to one of said side walls, a connector associated with the barrel nut and secured to the other of said side walls, means expanding said barrel nut portions into frictional engagement with the sleeve rigidly securing the sleeve between the side walls with its axis substantially normal thereto, a reel mounted within the container having a hub providing cylindrical bore means journalling the reel on said sleeve, and means lubricating the contact areas between the hub and sleeve.

6. A recording tape cartridge including a box-like container having two parallel spaced side walls, a precisely dimensioned smooth surfaced rigid cylindrical sleeve, a threaded barrel nut having radially flexible portions disposed coaxially inside the sleeve and secured to one of said side walls, a threaded connector associated with the barrel nut and secured to the other of said side walls, the threaded opening of the barrel nut being inwardly tapered for expanding said barrel nut portions into frictional engagement with the sleeve as the connector is turned into the nut to rigidly secure the sleeve between the side walls with its axis substantially normal thereto, a reel mounted within the container having a hub providing cylindrical bore means journalling the reel on said sleeve, and means lubricating the contact areas between the hub and sleeve.

No references cited.

MERVIN STEIN, *Primary Examiner.*

N. L. MINTZ, *Assistant Examiner.*